United States Patent
Tazume

(10) Patent No.: US 12,372,290 B2
(45) Date of Patent: Jul. 29, 2025

(54) CONTROL DEVICE, TRANSPORTATION MACHINE, CONTROL METHOD, AND TRANSPORTATION SYSTEM

(71) Applicant: RAKUTEN GROUP, INC., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 613 days.

(21) Appl. No.: 17/679,585

(22) Filed: Feb. 24, 2022

(65) Prior Publication Data

US 2022/0275990 A1    Sep. 1, 2022

(51) Int. Cl.
| | |
|---|---|
| F25D 11/02 | (2006.01) |
| A47G 29/14 | (2006.01) |
| B60P 9/00 | (2006.01) |
| F25D 11/00 | (2006.01) |
| F25D 25/04 | (2006.01) |
| G06Q 10/08 | (2023.01) |
| G06Q 10/0832 | (2023.01) |

(52) U.S. Cl.
CPC ............ *F25D 11/02* (2013.01); *A47G 29/141* (2013.01); *A47G 2029/142* (2013.01); *A47G 2029/147* (2013.01); *A47G 2029/149* (2013.01); *B60P 9/00* (2013.01); *F25D 11/003* (2013.01); *F25D 25/04* (2013.01); *G06Q 10/08* (2013.01); *G06Q 10/0832* (2013.01)

(58) Field of Classification Search
CPC ........ F25D 11/02; F25D 11/003; F25D 25/04; F25D 29/00; F25D 2700/06; A47G 29/141; A47G 2029/142; A47G 2029/147; A47G 2029/149; B60P 9/00; B60P 3/007; B60P 3/205; G06Q 10/08; G06Q 10/0832; G06Q 50/40; B65G 1/0492; B65G 1/1373; B65G 2203/02

See application file for complete search history.

(56) References Cited

U.S. PATENT DOCUMENTS

| | | | | |
|---|---|---|---|---|
| 7,597,492 | B2 * | 10/2009 | Hayashida | ........ H01L 21/67225 700/121 |
| 10,241,516 | B1 * | 3/2019 | Brady | ................ G06Q 10/0832 |
| 2010/0101075 | A1 * | 4/2010 | Hagiwara | ......... H01L 21/67742 700/275 |
| 2016/0232484 | A1 | 8/2016 | Skaaksrud | |
| 2016/0232485 | A1 * | 8/2016 | Skaaksrud | ............... H04L 67/10 |
| 2017/0259648 | A1 * | 9/2017 | Putcha | .................... B60P 3/007 |
| 2017/0349079 | A1 * | 12/2017 | Wilkinson | ............... B65G 1/06 |
| 2019/0362579 | A1 * | 11/2019 | Phillips | ................. F25D 29/006 |
| 2020/0247303 | A1 * | 8/2020 | Qiu | ..................... G06Q 10/1097 |

(Continued)

FOREIGN PATENT DOCUMENTS

| | | |
|---|---|---|
| CN | 107521890 A | 12/2017 |
| CN | 207020771 U | 2/2018 |

(Continued)

*Primary Examiner* — Robert E Fennema
*Assistant Examiner* — Olvin Lopez Alvarez
(74) *Attorney, Agent, or Firm* — Sughrue Mion, PLLC

(57) ABSTRACT

The UGV 1 is configured to move the article stored in the storing chamber B1 to the storing chamber B2 and perform the temperature control for the storing chamber B2 in a case where it is determined that the predetermined condition regarding the article stored in the storing chamber B1 among the plurality of storing chambers B is satisfied.

16 Claims, 11 Drawing Sheets

(56) References Cited

U.S. PATENT DOCUMENTS

| | | | |
|---|---|---|---|
| 2021/0073715 A1* | 3/2021 | Yamada | B64D 27/24 |
| 2021/0256472 A1* | 8/2021 | Javidan | H04W 4/12 |
| 2022/0058604 A1* | 2/2022 | Glucksman | G06Q 20/18 |

FOREIGN PATENT DOCUMENTS

| | | | | |
|---|---|---|---|---|
| CN | 112629121 A | * | 4/2021 | F25D 11/02 |
| FR | 2766148 A1 | * | 1/1999 | A47J 39/006 |
| JP | 2002-2365 A | | 1/2002 | |
| JP | 6431268 B2 | * | 11/2018 | B65G 1/137 |
| JP | 2020-529375 A | | 10/2020 | |
| JP | 2021-012715 A | | 2/2021 | |

\* cited by examiner

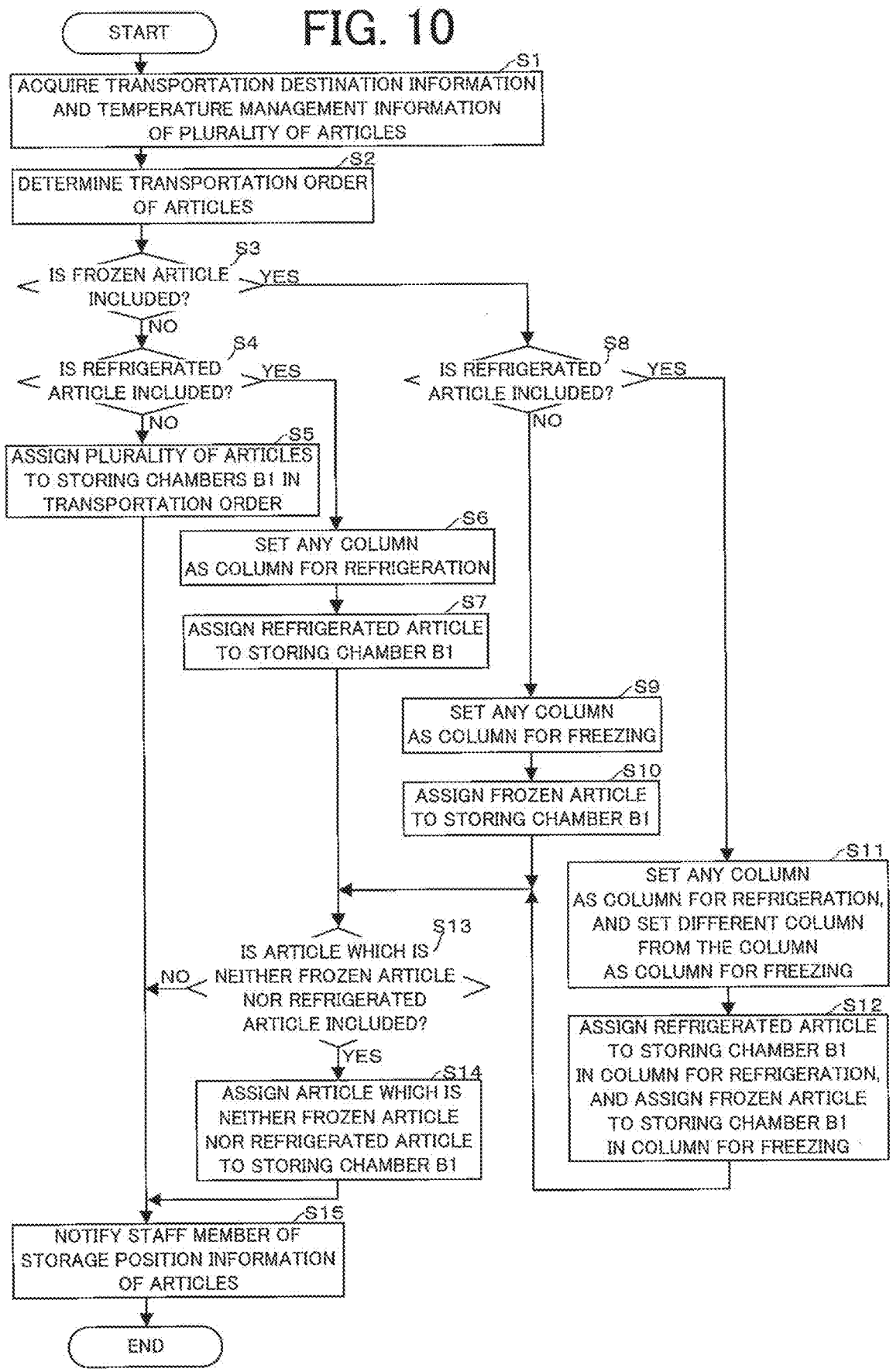

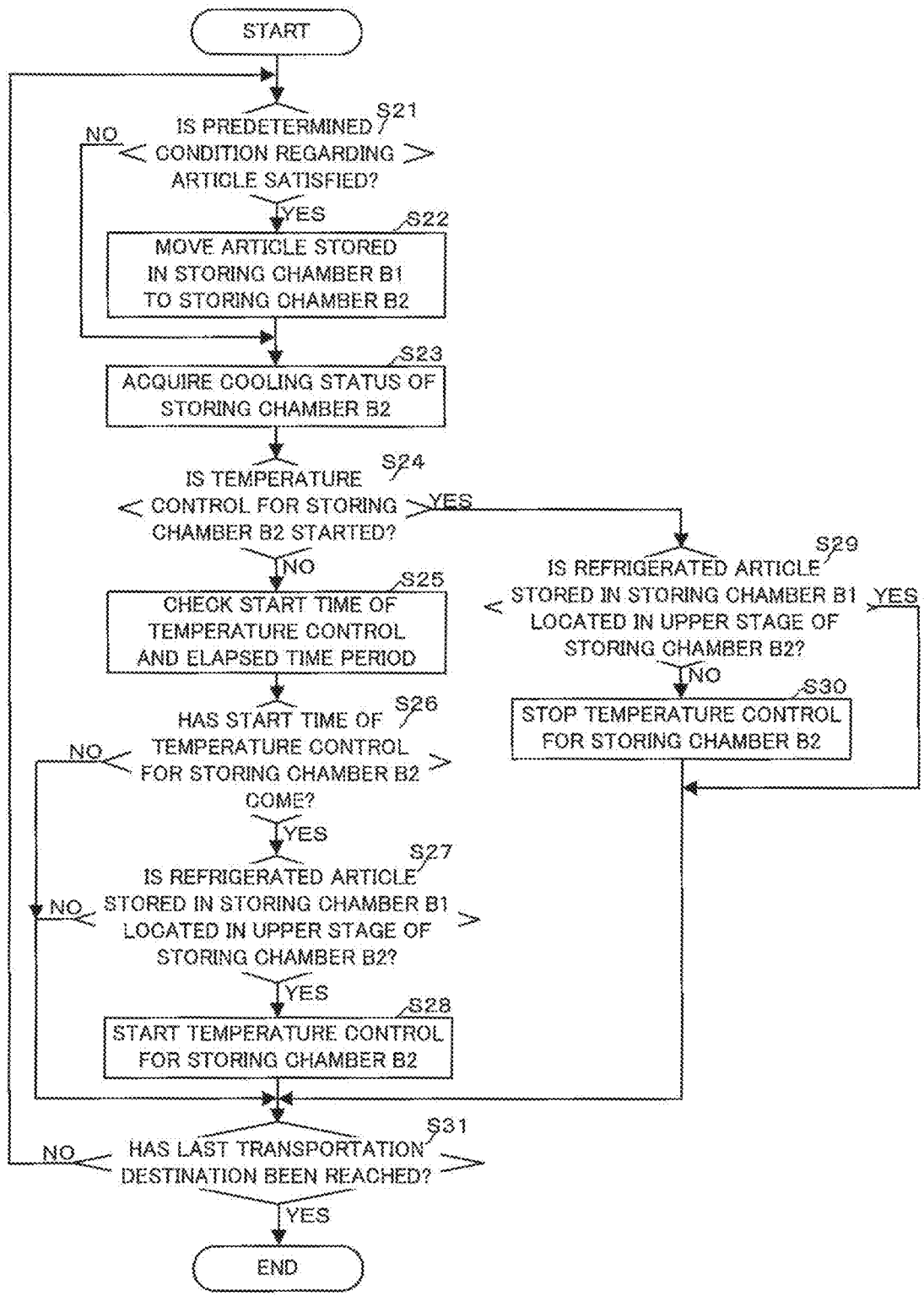

CONTROL DEVICE, TRANSPORTATION MACHINE, CONTROL METHOD, AND TRANSPORTATION SYSTEM

CROSS REFERENCE TO RELATED APPLICATION

This application claims priority from Japanese Patent Application No. 2021-28466 which was filed on Feb. 25, 2021, the disclosure of which is herein incorporated by reference in its entirety.

Technical Field

One or more embodiments of the present invention relates to a technical field for a system or the like for transporting articles using a transportation machine including a plurality of compartments capable of storing the articles.

Related Art

Conventionally, in order to reduce manpower cost required for transportation, a system for transporting articles using a transportation machine such as an autonomously movable robot has been studied. For example, JP 2020-529375 A discloses an autonomous robot vehicle capable of delivering food articles or the like by performing temperature control (heating or cooling) in compartments (sections) in which the articles are stored.

However, in a case where the transportation machine including the plurality of compartments capable of storing the articles continues to control the temperatures in the respective compartments, significant energy can be consumed, which is not desirable from the viewpoint of energy consumption.

Therefore, one or more embodiments of the present invention are directed to providing a control device, a transportation machine, a control method, and a transportation system that can improve the efficiency of energy consumption associated with temperature control in a plurality of compartments capable of storing articles.

SUMMARY

In response to the above issue, a control device is configured to control a transportation machine including a plurality of compartments each capable of storing an article, and includes: at least one memory configured to store program code; and at least one processor configured to access the program code and operate as instructed by the program code. The program code includes: article movement control code configured to cause the at least one processor to move an article stored in a first compartment among the plurality of compartments to a second compartment whose temperature is controllable among the plurality of compartments in a case where a predetermined condition regarding the article stored in the first compartment is satisfied; and temperature control code configured to cause the at least one processor to perform temperature control for the second compartment.

The program code further may include determination code configured to cause the at least one processor to determine whether or not the predetermined condition is satisfied. The article movement control code may cause the at least one processor to move the article stored in the first compartment to the second compartment in a case where it is determined that the predetermined condition is satisfied according to the determination code.

The predetermined condition may include a condition that the article requires temperature management.

The predetermined condition may include a condition that the article has not been received by a recipient.

The predetermined condition may include a condition that an elapsed time period from start of transportation of the article exceeds a predetermined time period associated with the article.

The transportation machine may include the plurality of first compartments. The article movement control code may cause the at least one processor to move the article stored in each of the first compartments to one the second compartment.

The temperature control code may cause the at least one processor to start the temperature control for the second compartment before the article moves from the first compartment to the second compartment after start of transportation of the article.

The temperature control code may cause the at least one processor to start the temperature control for the second compartment when start time of the temperature control comes after start of transportation of the article.

The start time of the temperature control may be determined on a basis of a time period during which temperature of the first compartment is kept in a temperature range in which quality of the article in the first compartment is preservable due to a temperature keeping effect of the first compartment.

The temperature control code may cause the at least one processor to stop the temperature control for the second compartment when the article is not present in either the first compartment or the second compartment by being received by a recipient after start of transportation of the article.

The temperature control code may cause the at least one processor to perform the temperature control for cooling an inside of the second compartment.

A transportation machine is configured to include a plurality of compartments each capable of storing an article, and includes a mechanism configured to move an article stored in a first compartment among the plurality of compartments to a second compartment whose temperature is controllable in response to a control command output in a case where a predetermined condition regarding the article is satisfied.

The first compartment may be a compartment having a temperature keeping effect.

The first compartment may be a compartment whose temperature is not controlled.

The transportation machine further may include a mechanism configured to make it impossible for a recipient at a transportation destination of the article to receive the article from the second compartment and make it possible for the recipient to receive the article from the first compartment.

The compartments may be provided in a plurality of stages in a vertical direction. The transportation machine further may include a mechanism that moves the article stored in the first compartment located at an upper stage to the second compartment located at a lower stage by opening a bottom portion of the first compartment.

The plurality of first compartments may be provided in a plurality of stages in the vertical direction. The transportation machine further may include a mechanism that moves the article stored in the first compartment located at an upper stage to the first compartment located at a lower stage by opening a bottom portion of the first compartment located at the upper stage.

A control method is executed by a computer that controls a transportation machine including a plurality of compartments each capable of storing an article. The control method includes: moving an article stored in a first compartment among the plurality of compartments to a second compartment whose temperature is controllable among the plurality of compartments in a case where a predetermined condition regarding the article stored in the first compartment is satisfied; and performing temperature control for the second compartment.

A transportation system includes: a transportation machine including a plurality of compartments each capable of storing an article; an article movement control unit configured to move an article stored in a first compartment among the plurality of compartments to a second compartment whose temperature is controllable among the plurality of compartments in a case where a predetermined condition regarding the article stored in the first compartment is satisfied; and a temperature control unit configured to perform temperature control for the second compartment.

BRIEF DESCRIPTION OF THE DRAWINGS

FIG. 10 is a flowchart illustrating an example of a storing chamber assignment processing executed by the control unit 23 of the management server 2.

FIG. 11 is a flowchart illustrating an example of a processing related to an article movement control and a temperature control executed by the control unit 17 of the UGV 1.

DETAILED DESCRIPTION

Hereinafter, one or more embodiments of the present invention will be described with reference to the drawings.

1. Configuration of Transportation System S

Figure 1:
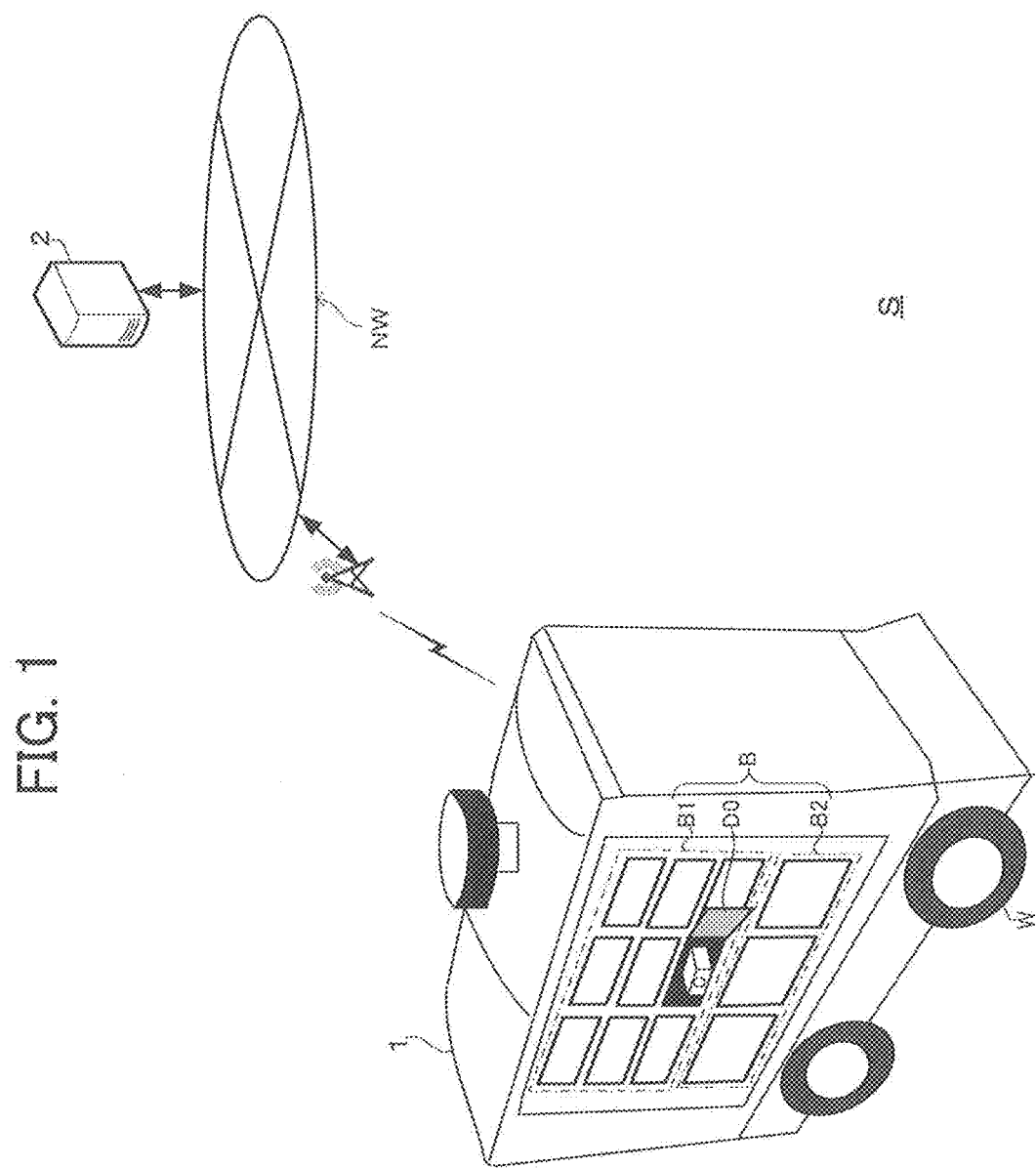
FIG. 1 is a diagram illustrating a schematic configuration example of a transportation system S.

First, a configuration of a transportation system S according to one or more embodiments of the present invention will be described with reference to FIG. 1. FIG. 1 is a diagram illustrating a schematic configuration example of the transportation system S. As illustrated in FIG. 1, the transportation system S includes an unmanned ground vehicle (hereinbelow referred to as a UGV (Unmanned Ground Vehicle)) 1 and a management server 2. The UGV 1 is an example of a transportation machine including a plurality of compartments capable of storing articles. Incidentally, in the description of the present embodiments, an example of the compartment is a box-shaped storing chamber B, but does not have to be the box-shaped storing chamber B as long as it is a compartment in which the space region for storing the article is separated from other space regions by flat plates or the like. The UGV 1 can communicate with the management server 2 via a communication network NW. Incidentally, the communication network NW includes the Internet, a mobile communication network and wireless base stations thereof, or the like.

The UGV 1 can autonomously travel on the ground in an unmanned manner. The UGV 1 may be a vehicle having a plurality of wheels, a robot (for example, a biped walking robot) having no wheels, or the like. The UGV 1 can transport (including delivery) the articles requiring temperature control. Examples of the article include an ordered item (e.g., commercial product) ordered at an EC (Electronic Commerce) site and a home delivery item. In a case where the article has not been received from the UGV 1 for some reason such as the absence of a recipient at a transportation destination, the UGV 1 can move to the next transportation destination or a transportation base while maintaining an appropriate temperature for the article. Here, the transportation destination is, for example, a delivery destination, and is a transfer place where the article is transferred, such as an entrance (doorway) of a residence where the recipient lives and an entrance of an office where the recipient works. The transportation base is a departure point, a transit point, or a return point for the UGV 1. The return point may be the same as the departure point. In the transportation base, an article is loaded onto the UGV 1, or an article that has not been received at the transportation destination is collected from the UGV 1.

1-1. Configuration and Functions of UGV 1

Figure 2:
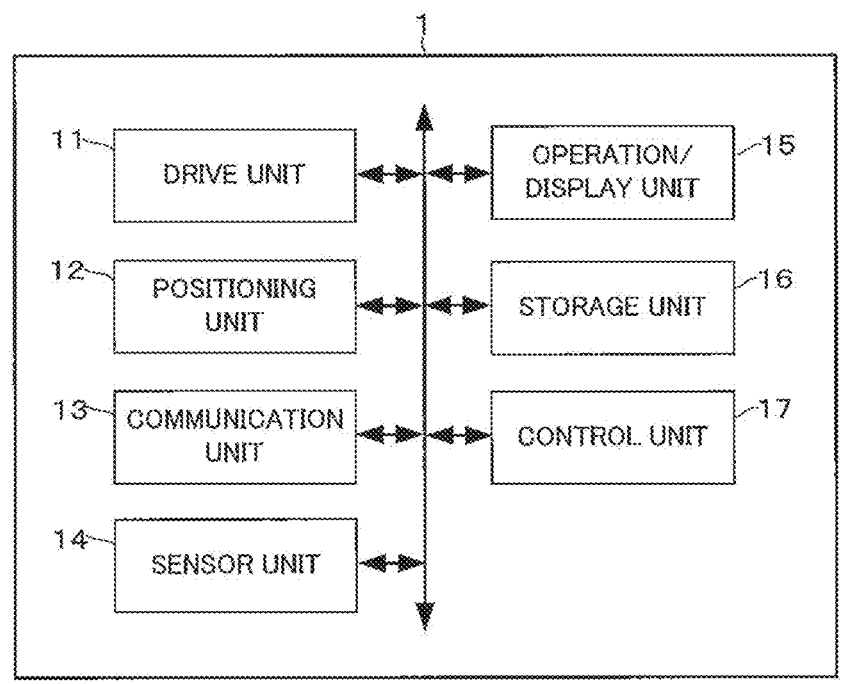
FIG. 2 is a diagram illustrating a schematic configuration example of an UGV 1.
Figure 3:
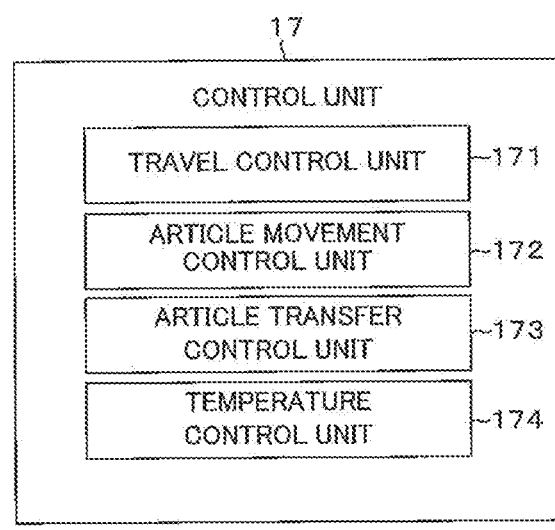
FIG. 3 is a diagram illustrating an example of functional blocks in a control unit 17.

Next, a configuration and functions of the UGV 1 will be described with reference to FIG. 2. FIG. 2 is a diagram illustrating a schematic configuration example of the UGV 1. As illustrated in FIG. 2, the UGV 1 includes a drive unit 11, a positioning unit 12, a communication unit 13, a sensor unit 14, an operation/display unit 15, a storage unit 16, a control unit 17, and the like. FIG. 3 is a diagram illustrating an example of functional blocks in the control unit 17. The UGV 1 further includes a power supply unit that supplies power (energy) to each of the units of the UGV 1, wheels W, the plurality of storing chambers B, and the like. The power supply unit may be a battery or a generator and an internal combustion engine. The internal combustion engine generates electric power by driving the generator with power generated by burning fuel.

The plurality of storing chambers B include storing chambers B1, whose temperatures are not controlled (an example of a first compartment), and storing chambers B2, whose temperatures are controllable (an example of a second compartment). Here, the temperature control refers to control for keeping the insides of the storing chambers B2 at set temperatures, such as that for a refrigerator or a freezer. In the present embodiments, particularly, the temperature control for cooling the insides of the storing chambers B2 is performed. Methods for cooling the insides of the storing chambers B2 can include refrigeration and freezing in accordance with the set temperatures. The set temperature for refrigeration is, for example, about 2° C. to 6° C. On the other hand, the set temperature for freezing is, for example, about −20° C. to −15° C. Since "the temperatures are controllable", the temperatures do not necessarily have to be controlled over the entire period during the transportation of the articles. The storing chambers B1, whose temperatures are not controlled, preferably have a temperature keeping effect (particularly, a low temperature keeping effect). Here, the temperature keeping effect refers to an effect of keeping the temperature without consuming energy, and for example, the storing chamber B1 is made of a material that keeps the temperature, such as a cooler box.

Moreover, the UGV 1 includes an article transfer mechanism that makes it impossible for the recipient at the transportation destination to receive the article from the storing chamber B2 and makes it possible for the recipient to receive the article from the storing chamber B1. This prevents energy from being unnecessarily consumed and enables the article to be smoothly transferred to the recipient. That is, the article can be smoothly transferred to the recipient while preventing wasteful energy consumption. The article transfer mechanism includes, for example, a front door provided on the front surface of the storing chamber B and an actuator including a motor, and is driven in response to a control command output from the control unit 17. For example, the article transfer mechanism unlocks (that is, releases the lock of) the front door in response to the control command. As a result, as illustrated in FIG. 1, the recipient can open a front door D0 of the storing chamber B1 and receive (e.g., pick up) an article C from the storing chamber B1. Incidentally, the article transfer mechanism may open (that is, automatically open) the front door D0 in response to the control command. On the other hand, the front door of the storing chamber B2 is locked so as not to be opened except when the UGV 1 is stopped at the transportation base.

Figure 4:
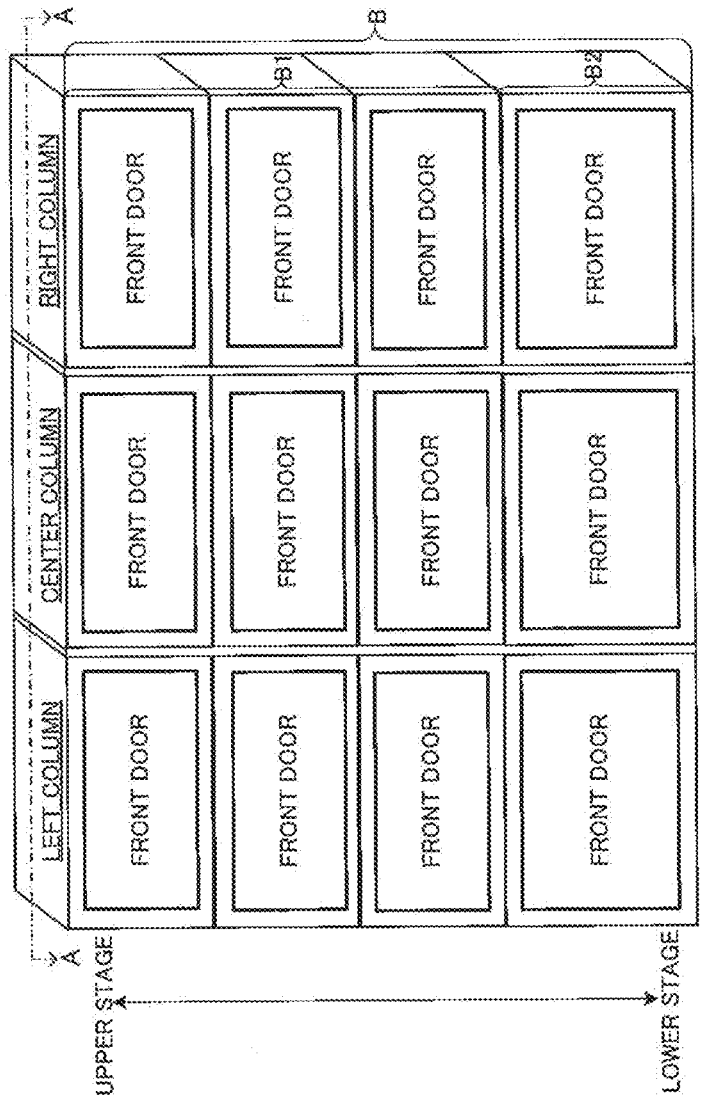
FIG. 4 is a view illustrating an arrangement example of storing chambers B in the UGV 1.

FIG. 4 is a view (front view) illustrating an arrangement example of the storing chambers B in the UGV 1. In the example in FIG. 4, the UGV 1 includes four stages in the vertical direction and three columns of storing chambers B. Incidentally, the number of stages and the number of columns of the storing chambers B illustrated in FIG. 4 are illustrative, are not particularly limited, and may be, for example, two stages and one column. In the example in FIG. 4, in each column, the storing chamber B2, whose temperature is controllable, is arranged at the lowermost stage, and a plurality of stages of the storing chambers B1, whose temperatures are not controlled, are arranged at the upper stages of the storing chamber B2. Furthermore, the UGV 1 includes an article movement mechanism that moves the article stored in the storing chamber B1 located at the upper stage to the storing chamber B2 located at the lower stage by opening the bottom portion of the storing chamber B1. As a result, the article stored in the storing chamber B1 can quickly and efficiently be moved to the storing chamber B2. The article movement mechanism includes a bottom door provided at the bottom portion of the storing chamber B1 and an actuator including a motor, and is driven in response to a control command output from the control unit 17.

In the example in FIG. 4, each article is stored in a separate storing chamber B1 so as to be transferred smoothly from the UGV 1 to the recipient, and in a case where the article has not been transferred to the recipient, the article is moved to the storing chamber B2 for collecting and storing a plurality of articles. Such collection enables the efficiency of energy consumption associated with the temperature control to be improved. Moreover, the UGV 1 further includes an article movement mechanism that moves the article stored in the storing chamber B1 located at the upper stage to another storing chamber B1 located at the lower stage by opening the bottom portion of the storing chamber B1 located at the upper stage.

Figure 5:
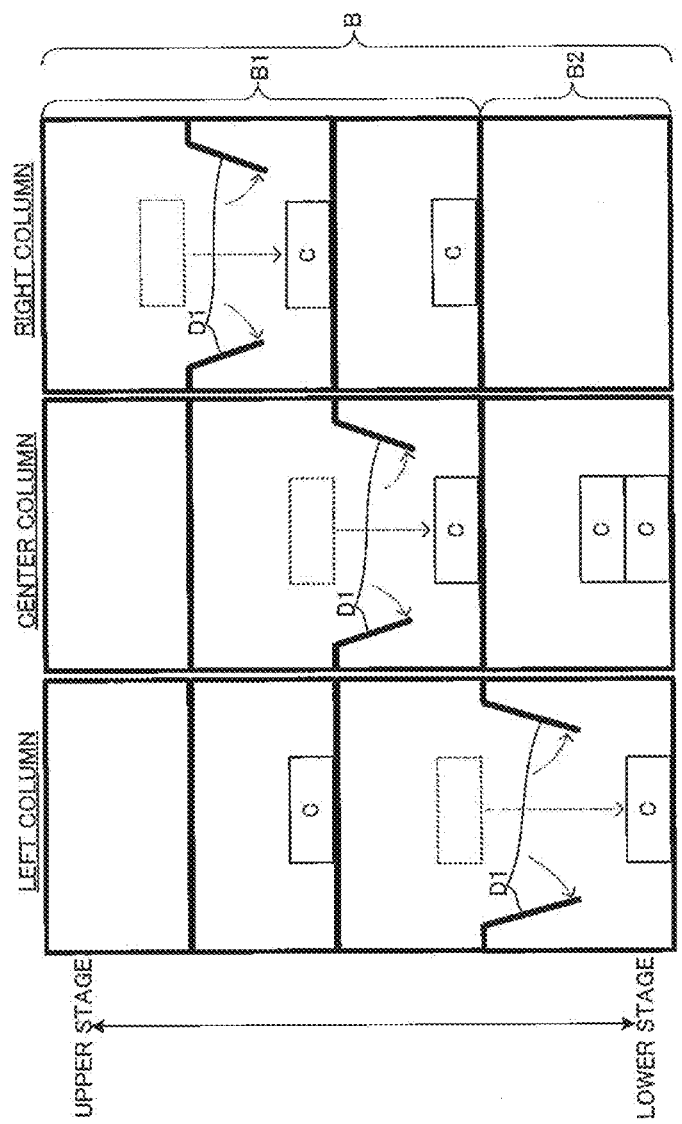
FIG. 5 is a view illustrating an example 1 of a bottom door provided at a bottom portion of the storing chamber B1.
Figure 6:
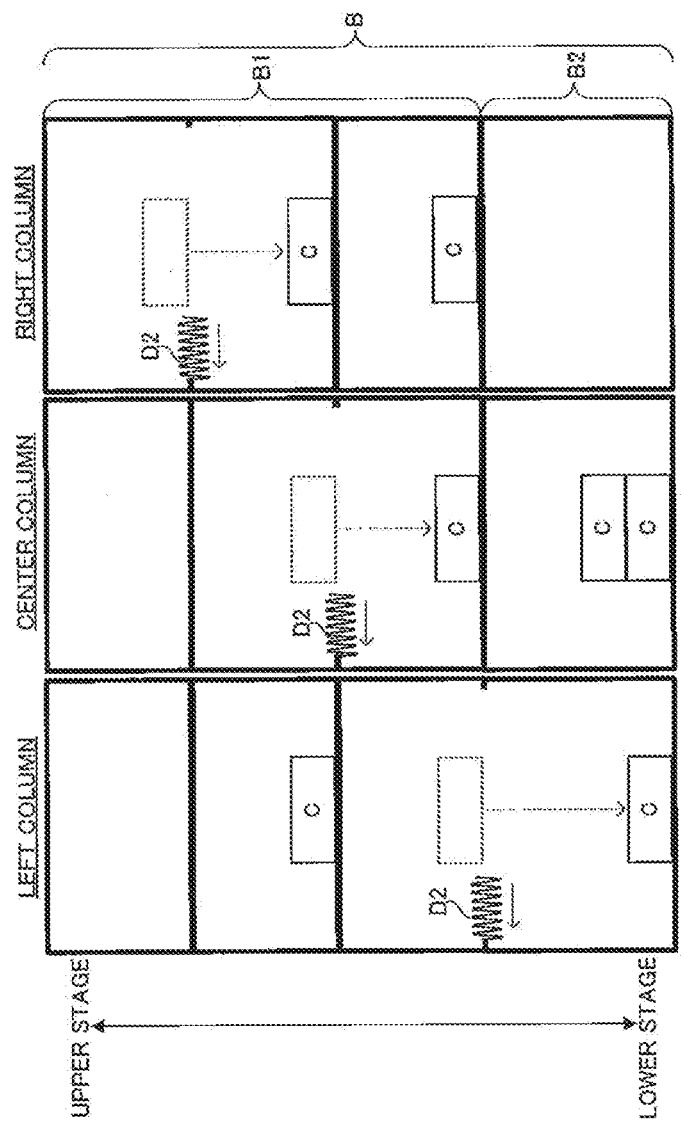
FIG. 6 is a view illustrating an example 2 of a bottom door provided at a bottom portion of the storing chamber B1.
Figure 7:
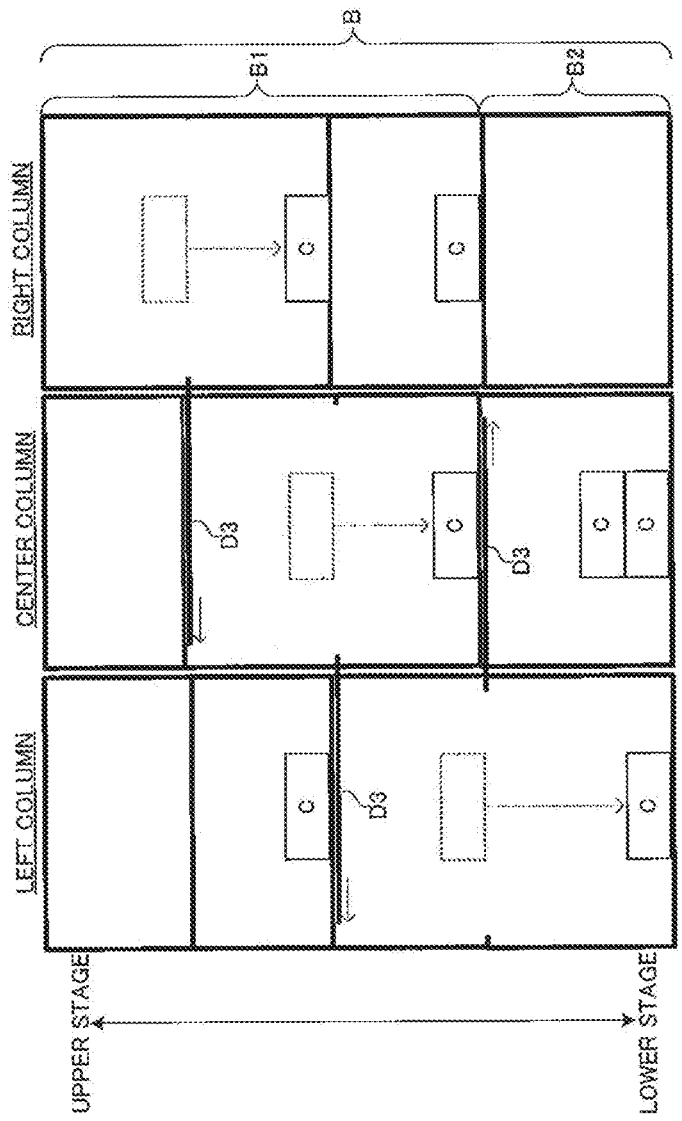
FIG. 7 is a view illustrating an example 3 of a bottom door provided at a bottom portion of the storing chamber B1.

FIGS. 5 to 7 are views (cross-sectional views taken along line A-A of FIG. 4) illustrating examples 1 to 3 of the bottom door provided at the bottom portion of the storing chamber B1. Incidentally, in the example in FIGS. 5 to 7, the bottom portion of the storing chamber B1 also serves as the ceiling portion of the other storing chamber B1 or B2 located at the lower stage of the storing chamber B1. In the example in FIG. 5, when attention is paid to the left column, a bottom door (ceiling door of the storing chamber B2 located at the lower stage of the storing chamber B1) D1 of the storing chamber B1 is formed as double swing doors. In the drawing, when the bottom door is opened downward, the bottom portion of the storing chamber B1 is opened, and the article C moves (descends) to the storing chamber B2 located at the lower stage of the storing chamber B1. Incidentally, the bottom door D1 may be formed as a single swing door. On the other hand, in the example in FIG. 6, when attention is paid to the center column, a bottom door (ceiling door of the storing chamber B1 located at the lower stage of the storing chamber B1) D2 of the storing chamber B1 is folded and formed in an accordion shape. When the bottom door is shrunk in the horizontal direction, the bottom portion of the storing chamber B1 is opened, and the article C moves (descends) to the storing chamber B1 located at the lower stage of the storing chamber B1. On the other hand, in the example in FIG. 7, when attention is paid to the right column, a bottom door (ceiling door of the storing chamber B1 located at the lower stage of the storing chamber B1) D3 of the storing chamber B1 is formed as a sliding door. When the bottom door slides in the horizontal direction (left direction), the bottom portion of the storing chamber B1 is opened, and the article C moves (descends) to the storing chamber B1 located at the lower stage of the storing chamber B1. According to the structures illustrated in FIGS. 5 to 7, the article stored in each of the storing chambers B1 can more efficiently be collected in the storing chamber B2, and the efficiency can be improved by collecting a plurality of articles.

The drive unit 11 includes a motor, a rotation shaft, and the like. The drive unit 11 rotates the plurality of wheels W by means of the motor driven in response to a control signal output from the control unit 17, the rotation shaft, and the like. The positioning unit 12 includes an electric wave receiver and the like. For example, the positioning unit 12 receives electric waves transmitted from a GNSS (Global Navigation Satellite System) satellite by means of the electric wave receiver, and detects the current position (latitude and longitude) of the UGV 1 on the basis of the electric waves. Incidentally, the current position of the UGV 1 may be specified by SLAM (Simultaneous Localization and Mapping) processing in addition to electric waves transmitted from the GNSS satellite. The current position of the UGV 1 may be corrected on the basis of an image captured by a camera of the sensor unit 14. Positional information indicating the current position detected by the positioning unit 12 is output to the control unit 17.

The communication unit 13 controls communication performed via the communication network NW. Moreover, the communication unit 13 may have a short-range wireless communication function such as Bluetooth (registered trademark) and perform short-range wireless communication with a mobile terminal (for example, a smartphone) of the recipient. The sensor unit 14 includes an optical sensor such as a camera. For example, the optical sensor continuously senses (for example, images) a real space in a range (for example, the periphery of the UGV 1) of the viewing angle of the camera. Moreover, the sensor unit 14 may include a sensor for detecting that the article has been received (e.g., picked up) from the storing chamber B1. Such a sensor may be a sensor that detects opening of the front door of the storing chamber B1, or may be a sensor that measures the weight of the article stored in the storing chamber B1. Sensing information obtained by sensing of the sensor unit 14 is output to the control unit 17. The operation/display unit 15 includes a display (touch panel) having an input function of receiving an operation of the recipient and a display function of displaying information.

The storage unit 16 includes a nonvolatile memory or the like, and stores various programs and data. The storage unit 16 stores a machine ID (vehicle ID) of the UGV 1. The machine ID is identification information for identifying the UGV 1. Moreover, the storage unit 16 stores a cooling status of each of the storing chambers B2. The cooling status indicates whether or not cooling has been started (that is, the temperature control has been started.). The storage unit 16 further stores article management information. The article management information is information for managing the articles stored in the storing chambers B. The article management information includes an article ID of an article, storage position information of the article, transportation destination information of the article, temperature management information of the article, recipient information of the article, and receipt/non-receipt information of the article, which are associated with each other for each article.

Here, the article ID is identification information for identifying each article. The storage position information is information indicating an arrangement position of the storing chamber B that stores the article. The arrangement position may be expressed as the third stage from the top of the right column, for example, or may be expressed as an arrangement number allocated to each of the storing chambers B. The transportation destination information is information indicating the location of the transportation destination of the article. The location may be expressed as the address of the transportation destination, or may be expressed as the positional information (latitude and longitude) of the transportation destination.

The temperature management information is information indicating whether or not the article requires the temperature management. Whether or not the article requires the temperature management may be expressed as a flag (0 or 1), for example. The article requiring the temperature management is an article that needs to be stored in the storing chamber B2 when a predetermined time period associated with the article has elapsed. In a case where the article requires the temperature management, the temperature management information includes an article type (category) and the predetermined time period associated with the article. According to the article type, the articles can roughly be divided into refrigerated articles and frozen articles. The refrigerated article is an article requiring refrigeration, such as fresh food and milk. The frozen article is an article requiring freezing, such as frozen food and ice cream. The predetermined time period is a time period (hereinbelow referred to as "a quality preservable time period") during which the quality of the article is preservable when the article is stored in the storing chamber B1, whose temperature is not controlled, and differs depending on the type of the article requiring the temperature management.

Moreover, the quality preservable time period also differs depending on whether or not the storing chamber B1 has the temperature keeping effect. In a case where the storing chamber B1 has the temperature keeping effect, the quality preservable time period is a time period during which the temperature of the storing chamber B1 is kept in a temperature range in which the quality of the article in the storing chamber B1 is preservable due to the temperature keeping effect. The quality preservable time period may be calculated from the predetermined time period associated with the article and a time period (a preset time period in accordance with the performance of the heat insulating structure or the like) in accordance with the temperature keeping effect of the storing chamber B1. Incidentally, in a case where the storing chamber B1 has no temperature keeping effect, the quality preservable time period is the predetermined time period associated with the article.

The recipient information includes a user ID of the recipient, a mail address, a code required for transferring the article, and the like. The receipt/non-receipt information is information indicating whether or not the article has been received by the recipient. Whether or not the article has been received by the recipient may be expressed as a flag, for example. Incidentally, the article management information may be set in the UGV 1 at the transportation base, or may be transmitted from the management server 2 and set. Moreover, in a case where the storage position information and the receipt/non-receipt information included in the article management information are updated as described below, the updated storage position information and the updated receipt/non-receipt information, as well as the machine ID of the UGV 1, are transmitted to the management server 2 by the communication unit 13.

The control unit 17 includes at least one CPU (Central Processing Unit), a ROM (Read Only Memory), a RAM (Random Access Memory), and the like, and executes various kinds of control in accordance with a program (program code) stored in the ROM (or the storage unit 16). The control unit 17 is an example of a control device. The CPU (an example of processor) is configured to access the program code and operate as instructed by the program code. The program code includes: article movement control code configured to cause the CPU to move the article stored in the storing chamber B1 among the plurality of storing chambers to the storing chamber B2 whose temperature is controllable among the plurality of storing chambers in a case where a predetermined condition regarding the article stored in the storing chamber B1 is satisfied; and temperature control code configured to cause the CPU to perform temperature control for the storing chambers B2. The program code further may include determination code configured to cause the CPU to determine whether or not the predetermined condition is satisfied. The article movement control code may cause the CPU to move the article stored in the storing chambers B1 to the storing chambers B2 in a case where it is determined that the predetermined condition is satisfied according to the determination code.

By executing the program, as illustrated in FIG. 3, the control unit 17 functions as a travel control unit 171, an article movement control unit 172, an article transfer control unit 173, and a temperature control unit 174 in accordance with the program code stored in, for example, the ROM or the storage unit 16. Incidentally, as will be described below, the control unit 17 may function as a determination unit that determines whether or not a predetermined condition regarding the article is satisfied.

The travel control unit 171 performs travel control to cause the UGV 1 to travel to the transportation destination. In such travel control, the revolution speed of the wheels W and the position and traveling direction of the UGV 1 are controlled with use of the positional information acquired from the positioning unit 12, the sensing information acquired from the sensor unit 14, the transportation destination information, and the like. As a result, the UGV 1 can autonomously move to the transportation destination. Incidentally, while the UGV 1 is traveling, the positional information of the UGV 1 and the machine ID of the UGV 1 are sequentially transmitted to the management server 2 by the communication unit 13.

In a case where it is determined that the predetermined condition regarding the article stored in the storing chamber B1 is satisfied, the article movement control unit 172 performs article movement control to move the article stored in the storing chamber B1 to the storing chamber B2, whose temperature is controllable. In the article movement control, the control command for driving the article movement mechanism in a case where the predetermined condition is satisfied is output from the article movement control unit 172 to the article movement mechanism. Such a control command is, for example, a control command for opening the bottom portion of the storing chamber B1 that stores the article targeted for determination. Whether or not the predetermined condition is satisfied may be determined by the control unit 17 as a determination unit or by a control unit 23 of the management server 2 as a determination unit. Incidentally, preferably, the determination as to whether or not the predetermined condition is satisfied is repeatedly performed regularly or irregularly.

The predetermined condition includes at least one of (i) a condition that the article stored in the storing chamber B1 requires the temperature management, (ii) a condition that the article stored in the storing chamber B1 has not been received by the recipient, and (iii) a condition that an elapsed time period from the start of transportation of the article stored in the storing chamber B1 exceeds the quality preservable time period of the article. In the determination as to whether or not the condition (i) is satisfied, the temperature management information of the article is referred to. In the determination as to whether or not the condition (ii) is satisfied, the receipt/non-receipt information of the article is referred to. In the determination as to whether or not the condition (iii) is satisfied, the predetermined time period included in the temperature management information of the article is used.

For example, in a case where the predetermined condition is the condition (i), that is, in a case where it is determined that the article stored in the storing chamber B1 requires the temperature management, the article movement control unit 172 moves the article stored in the storing chamber B1 to the storing chamber B2. In a case where the predetermined condition is the condition (ii), that is, in a case where it is determined that the article stored in the storing chamber B1 has not been received by the recipient (that is, the article has not been received due to the absence of the recipient at the transportation destination or the like), the article movement control unit 172 moves the article stored in the storing chamber B1 to the storing chamber B2. In a case where the predetermined condition is the condition (iii), that is, in a case where it is determined that the elapsed time period from the start of transportation of the article stored in the storing chamber B1 exceeds the quality preservable time period of the article, the article movement control unit 172 moves the article stored in the storing chamber B1 to the storing chamber B2.

In a case where the predetermined condition is the condition (i) and the condition (ii), that is, in a case where it is determined that the article stored in the storing chamber B1 requires the temperature management and where it is determined that the article has not been received by the recipient, the article movement control unit 172 moves the article stored in the storing chamber B1 to the storing chamber B2. In a case where the predetermined condition is the condition (i) and the condition (iii), that is, in a case where it is determined that the article stored in the storing chamber B1 requires the temperature management and where it is determined that the elapsed time period from the start of transportation of the article exceeds the quality preservable time period of the article, the article movement control unit 172 moves the article stored in the storing chamber B1 to the storing chamber B2.

In a case where the predetermined condition is the condition (ii) and the condition (iii), that is, in a case where it is determined that the article stored in the storing chamber B1 has not been received by the recipient and where it is determined that the elapsed time period from the start of transportation of the article exceeds the quality preservable time period of the article, the article movement control unit 172 moves the article stored in the storing chamber B1 to the storing chamber B2. In a case where the predetermined condition is the condition (i), the condition (ii), and the condition (iii), that is, in a case where it is determined that the article stored in the storing chamber B1 requires the temperature management, where it is determined that the article has not been received by the recipient, and where it is determined that the elapsed time period from the start of transportation of the article exceeds the quality preservable time period of the article, the article movement control unit 172 moves the article stored in the storing chamber B1 to the storing chamber 82.

Moreover, after moving the article stored in the storing chamber B1 to the storing chamber B2, the article movement control unit 172 updates the storage position information of the article moved to the storing chamber B2 (that is, changes the arrangement position of the storing chamber B that stores the article from the storing chamber B1 to the storing chamber B2). In a case where the storing chamber B1 exists at the upper stage of the storing chamber B1 which becomes empty as a result of movement to the storing chamber B2 in this manner, the article movement control unit 172 preferably determines whether or not the article is stored in the upper storing chamber B1. In such determination, the storage position information of the article (that is, the article that has not been received by the recipient) in the UGV 1 is referred to.

Then, in a case where it is determined that the article is stored in the upper storing chamber B1, the article movement control unit 172 performs the article movement control to move the article stored in the upper storing chamber B1 to the storing chamber B1 located at the lower stage of the upper storing chamber B1. In the article movement control, a control command (that is, the control command for opening the bottom portion of the upper storing chamber B1) for driving the article movement mechanism is output from the article movement control unit 172 to the article movement mechanism. Moreover, after moving the article stored in the upper storing chamber B1 to the lower storing chamber B1, the article movement control unit 172 updates the storage position information of the article moved to the storing chamber B1.

Incidentally, in a case where the storing chamber B1 exists further at the upper stage than the upper storing chamber B1 which becomes empty as a result of movement to the lower storing chamber B1, the article movement control unit 172 preferably determines whether or not the article is stored in the storing chamber B1 further at the upper stage, and in a case where it is determined that the article is stored in the storing chamber B1 further at the upper stage, the article movement control unit preferably performs the article movement control to move the article stored in the storing chamber B1 further at the upper stage to the storing chamber B1 located at the lower stage of the storing chamber B1 further at the upper stage. As a result, a plurality of articles requiring the temperature management can be collected to be close to one another, and the low temperature keeping effect of the storing chamber B1 can be enhanced. As the article movement control is repeated, the article stored in the storing chamber B1 located at the uppermost stage is finally stored in the storing chamber B2 unless received by the recipient. That is, the article movement control unit 172 can move the articles respectively stored in the plurality of storing chambers B1 to one storing chamber B2.

The article transfer control unit 173 performs article transfer control to transfer the article from the storing chamber B1 to the recipient at the transportation destination. In the article transfer control, the control command for driving the article transfer mechanism is output from the article transfer control unit 173 to the article transfer mechanism. For example, when a code (an example of a code required for transferring the article) for unlocking the front door D0 by the recipient at the transportation destination is input into the article transfer control unit 173, a control command for unlocking the front door D0 of the storing chamber B1 storing the article to be received by the recipient is output to the article movement mechanism.

Moreover, when a code (an example of a code required for transferring the article) for opening the front door D0 by the recipient at the transportation destination is input into the article transfer control unit 173, a control command for opening the front door D0 of the storing chamber B1 storing the article to be received by the recipient may be output to the article movement mechanism. The code may be input from the operation/display unit 15 by the recipient, or may be input from the mobile terminal of the recipient and transmitted to the UGV 1. Moreover, the code may be a code issued uniquely to the recipient, or may be a code registered in advance as biometric data (fingerprint data) of the recipient.

In a case where the article is transferred from the storing chamber B1 to the recipient at the transportation destination, the article transfer control unit 173 updates the receipt/non-receipt information of the article (for example, changes the flag from 1 to 0) and updates the storage position information of the article (that is, changes the arrangement position of the storing chamber B that stores the article from the storing chamber B1 to none). Whether or not the article has been transferred is determined on the basis of, for example, the sensing information output from the sensor for detecting that the article has been received from the storing chamber B1. Incidentally, similarly to the above case, in a case where the storing chamber B1 exists at the upper stage of the storing chamber B1 which becomes empty as a result of transfer of the article, the article movement control unit 172 preferably determines whether or not the article is stored in the upper storing chamber B1, and in a case where it is determined that the article is stored in the upper storing chamber B1, the article movement control unit 172 preferably performs the article movement control to move the article stored in the upper storing chamber B1 to the storing chamber B1 located at the lower stage of the upper storing chamber B1.

The temperature control unit 174 performs the temperature control for the storing chamber B2. For example, the temperature control unit 174 performs the temperature control for cooling the inside of the storing chamber B2 for each storing chamber B2. In the example in FIG. 4, the temperature control unit 174 performs the temperature control for refrigerating the article stored in the storing chamber B2 located in the left column, and performs the temperature control for freezing the articles stored in the storing chambers B2 located in the center column and the right column. The temperature control unit 174 preferably starts the temperature control for the storing chamber B2 before the article stored in the storing chamber B moves from the storing chamber B1 to the storing chamber B2 after the start of the transportation of the article by the UGV 1. The reason for this is that it takes a certain amount of time (hereinbelow referred to as "a required cooling time period") to cool the inside of the storing chamber B2. As a result, the cooling effect by the temperature control can be exhibited immediately after the article stored in the storing chamber B1 is moved to the storing chamber B2.

For example, the temperature control unit 174 starts the temperature control for the storing chamber B2 when start time of the temperature control comes after the start of transportation of the article by the UGV 1. In this case, the temperature control is not performed until a predetermined time elapses from the start of transportation. This enables the efficiency of energy consumption associated with the temperature control to be further improved. The start time of the temperature control for the storing chamber B2 may be determined on the basis of, for example, the quality preservable time period of the article in the storing chamber B1 located at the upper stage of the storing chamber B2. For example, in a case where the quality preservable time period is thirty minutes, the start time of the temperature control is determined to be time between the start of transportation and time immediately before the lapse of thirty minutes. Preferably, the start time of the temperature control is determined on the basis of the quality preservable time period and the required cooling time period.

Figure 8:
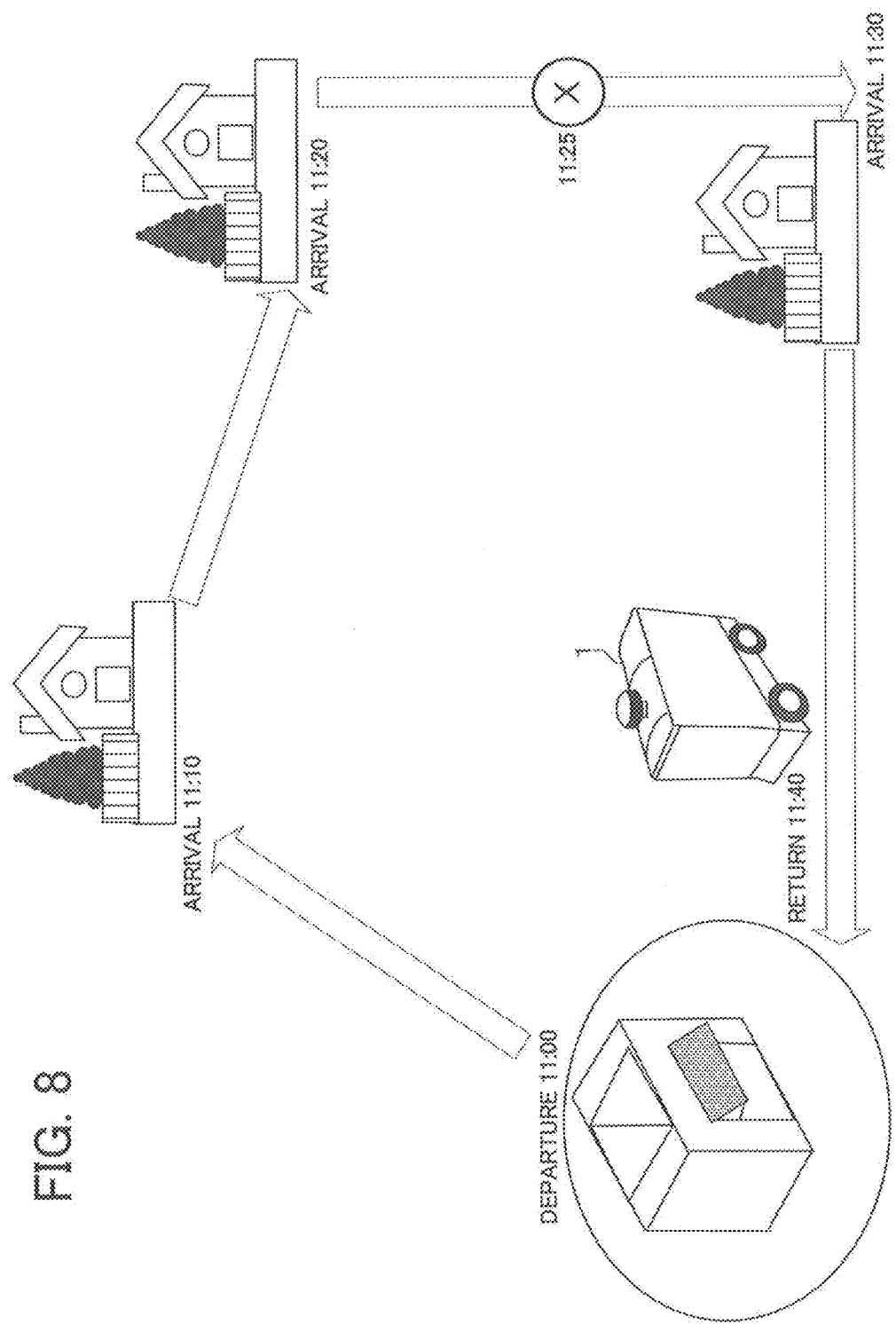
FIG. 8 is a conceptual diagram illustrating a transportation route for the UGV 1 from departure to return via a plurality of transportation destinations, and scheduled time of arrival at transportation destinations on a transportation route.

FIG. 8 is a conceptual diagram illustrating a transportation route for the UGV 1 from departure (transportation start) to return via a plurality of transportation destinations, and scheduled time of arrival at the transportation destinations on the transportation route. For example, in a case where the quality preservable time period is thirty minutes and where the required cooling time period is five minutes, the start time of the temperature control for the storing chamber B2 is started at a point X where twenty five minutes (=thirty minutes–five minutes) have elapsed from the start of transportation, and thus, it is possible to further improve the efficiency of energy consumption associated with the temperature control. Incidentally, the temperature control unit 174 stops the temperature control for the storing chamber B2 when the article is not present in either the storing chamber B1 or the storing chamber B2 by being received by the recipient after the start of the transportation of the article by the UGV 1. This also enables the efficiency of energy consumption associated with the temperature control to be improved.

1-2. Configuration and Functions of Management Server 2

Figure 9:
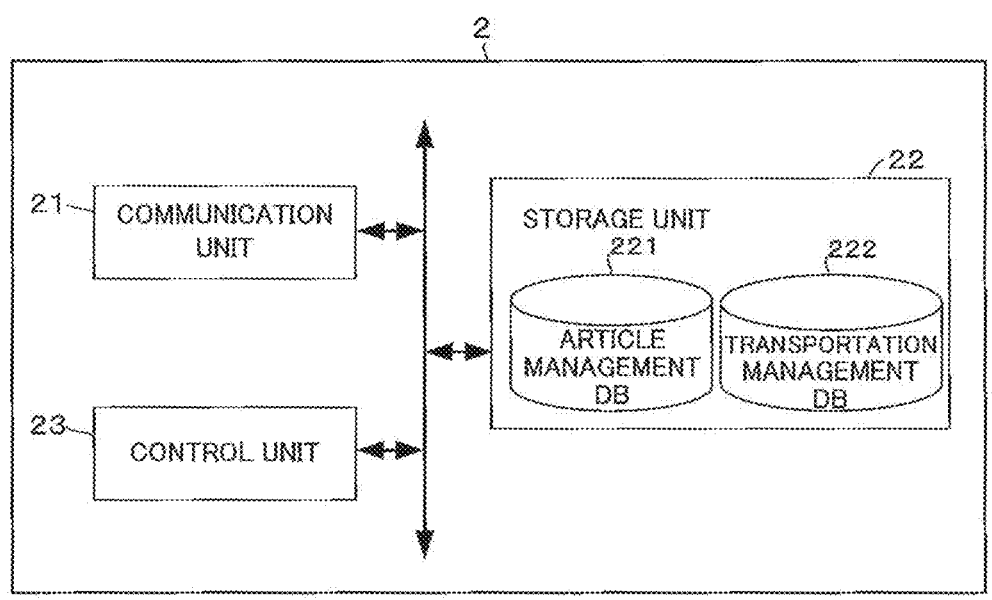
FIG. 9 is a diagram illustrating a schematic configuration example of a management server 2.

Next, a configuration and functions of the management server 2 will be described with reference to FIG. 9. FIG. 9 is a diagram illustrating a schematic configuration example of the management server 2. As illustrated in FIG. 9, the management server 2 includes a communication unit 21, a storage unit 22, the control unit 23, and the like. The communication unit 21 controls communication performed via the communication network NW. The positional information and the machine ID transmitted from the UGV 1 are received by the communication unit 21. The management server 2 can recognize the current position of the UGV 1 from the positional information of the UGV 1. The storage unit 22 includes, for example, a hard disk drive, and stores various programs and data. Moreover, in the storage unit 22, an article management database (DB) 221, a transportation management database 222, and the like are constructed.

The article management database 221 is a database for managing the articles transported by the UGV 1. In the article management database 221, the article ID of the article, the storage position information of the article, the transportation destination information of the article, the temperature management information of the article, the recipient information of the article, the receipt/non-receipt information of the article, UGV information of the UGV 1 that transports the article, and the like are stored in association with each other for each article. Here, the UGV information includes the machine ID of the UGV 1, address information for accessing the UGV 1, and the like. Incidentally, when the storage position information updated by the UGV 1, as well as the machine ID, is received by the communication unit 21, the storage position information in the article management database 221 is updated. Moreover, when the receipt/non-receipt information updated by the UGV 1, as well as the machine ID, is received by the communication unit 21, the receipt/non-receipt information in the article management database 221 is updated.

The transportation management database 222 is a database for managing transportation of the articles by the UGV 1. In the transportation management database 222, the machine ID of the UGV 1, the article ID of the article transported by the UGV 1, transportation schedule, and the like are stored in association with each other for each UGV 1. Here, the transportation schedule includes, for example, the transportation route for the UGV 1 from departure from the departure point to return to the return point via the transportation destinations indicated in the transportation destination information, the scheduled time of arrival at the respective points on the transportation route, and the like.

The control unit 23 includes a CPU, a ROM, a RAM, and the like, and executes various kinds of processing in accordance with a program stored in the ROM or the storage unit 22. The control unit 23 assigns each of the plurality of articles to be transported by the selected UGV 1 to the storing chamber B1 (that is, the storage position) on the basis of the transportation destination information and the temperature management information of the plurality of articles, and creates (generates) the storage position information of each article.

Incidentally, the control unit 23 may function as the determination unit that determines whether or not the predetermined condition regarding the article stored in the storing chamber B1 among the plurality of storing chambers B in the UGV 1 is satisfied, and as the article movement control unit. For example, in a case where the control unit 23 determines that the predetermined condition regarding the article stored in the storing chamber B1 is satisfied, the control unit 23 causes the communication unit 21 to transmit to the UGV 1 control information for moving the article stored in the storing chamber B1 to the storing chamber B2. The control information includes the article ID of the article to be moved and the arrangement position of the storing chamber B2 as the movement destination. In this case, the article movement control unit 172 of the UGV 1 receives the control information from the control unit 23 and outputs the control command for driving the article movement mechanism to the article movement mechanism.

Moreover, the control unit 23 may perform the temperature control for the storing chamber B2 as the temperature control unit by causing the communication unit 21 to transmit to the UGV 1 control information for starting or stopping the temperature control for the storing chamber B2. In this case, the temperature control unit 174 of the UGV 1 receives the control information from the control unit 23 and starts or stops the temperature control. Incidentally, the control unit 23 operates as the control device in a case of functioning as the article movement control unit and the temperature control unit.

2. Operation of Transportation System S

Next, an operation of the transportation system S according to the present embodiment will be described.

(2-1. Storing Chamber Assignment Processing of Management Server 2)

First, storing chamber assignment processing executed by the control unit 23 of the management server 2 will be described with reference to FIG. 10. FIG. 10 is a flowchart illustrating an example of the storing chamber assignment processing executed by the control unit 23 of the management server 2. Incidentally, in the storing chamber assignment processing illustrated in FIG. 10, the UGV 1 including a plurality of stages and a plurality of columns of storing chambers B is assumed.

The processing illustrated in FIG. 10 is started in response to an operation of an operator after the UGV 1 is selected, for example. When the processing illustrated in FIG. 10 is started, the control unit 23 acquires the transportation destination information and the temperature management information of a plurality of articles to be transported by the selected UGV 1 (step S1). Subsequently, the control unit 23 determines a transportation order of the respective articles on the basis of the transportation destination information acquired in step S1 (step S2). For example, the transportation order is determined in order of closeness of the transportation destination from the departure point of the UGV 1.

Subsequently, the control unit 23 determines whether or not a frozen article is included in the plurality of articles to be transported on the basis of the temperature management information acquired in step S1 (step S3). In a case where it is determined that no frozen article is included in the plurality of articles (step S3: NO), the processing proceeds to step S4. Conversely, in a case where it is determined that a frozen article is included in the plurality of articles (step S3: YES), the processing proceeds to step S8.

In step S4, the control unit 23 determines whether or not a refrigerated article is included in the plurality of articles to be transported on the basis of the temperature management information acquired in step S1. In a case where it is determined that no refrigerated article is included in the plurality of articles (step S4: NO), the control unit 23 assigns the plurality of respective articles to the storing chambers B1 in the transportation order on the basis of the transportation order determined in step S2 (step S5), and the processing then proceeds to step S15. Conversely, in a case where it is determined that a refrigerated article is included in the plurality of articles (step S4: YES), the processing proceeds to step S6.

In step S6, the control unit 23 sets any one of the plurality of columns of storing chambers B as a column for refrigeration. Here, the number of columns set as columns for refrigeration varies depending on the number of stages of the storing chambers and the number of refrigerated articles. Subsequently, the control unit 23 assigns the refrigerated article preferentially to the storing chamber B1 of lowermost stage in the column set as the column for refrigeration in step S6 (step S7). Here, in a case where there are a plurality of refrigerated articles to be transported, the control unit 23 assigns the plurality of respective refrigerated articles to the lowermost stage to the upper stages of storing chambers B1 in the transportation order determined in step S2. That is, the refrigerated article having the earliest transportation order is assigned to the lowermost storing chamber B1. Thereafter, the processing proceeds to step S15.

In step S8, the control unit 23 determines whether or not a refrigerated article is included in the plurality of articles to be transported on the basis of the temperature management information acquired in step S1. In a case where it is determined that no refrigerated article is included in the plurality of articles (step S8: NO), the processing proceeds to step S9. Conversely, in a case where it is determined that a refrigerated article is included in the plurality of articles (step S8: YES), the processing proceeds to step S11.

In step S9, the control unit 23 sets any one of the plurality of columns of storing chambers B as a column for freezing. Here, the number of columns set as columns for freezing varies depending on the number of stages of the storing chambers and the number of frozen articles. Subsequently, the control unit 23 assigns the frozen article preferentially to the lowermost storing chamber B1 of the column set as the column for freezing in step S9 (step S10). Here, in a case where there are a plurality of frozen articles to be transported, the control unit 23 assigns the plurality of respective frozen articles to the lowermost stage to the upper stages of storing chambers B1 in the transportation order determined in step S2. Thereafter, the processing proceeds to step S13.

In step S11, the control unit 23 sets any one of the plurality of columns of storing chambers B as a column for refrigeration and sets a different column from the column as a column for freezing. Subsequently, the control unit 23 assigns the refrigerated article to the storing chamber B1 (the lowermost storing chamber B1 is prioritized) in the column (the column for refrigeration) set as the column for refrigeration in step S11, and assigns the frozen article to the storing chamber B1 (the lowermost storing chamber B1 is prioritized) in the column (the column for freezing) set as the column for freezing in step S11 (step S12). Thereafter, the processing proceeds to step S13.

In step S13, the control unit 23 determines whether or not an article (that is, an article not requiring the temperature management) which is neither the frozen article nor the refrigerated article is included in the plurality of articles to be transported. In a case where it is determined that no article which is neither the frozen article nor the refrigerated article is included in the plurality of articles (step S13: NO), the processing proceeds to step S15. Conversely, in a case where it is determined that an article which is neither the frozen article nor the refrigerated article is included in the plurality of articles (step S13: YES), the control unit 23 assigns the article to an empty storing chamber B1 (storing chamber B1 to which the frozen article or the refrigerated article is not assigned) (step S14), and then the processing proceeds to step S15.

In step S15, the control unit 23 creates the storage position information of the respective articles in accordance with the assignment results of the respective articles to the plurality of storing chambers B1, and notifies a staff member who performs the article loading work of the storage position information (for example, transmits the storage position information to the terminal of the staff member). As a result, the staff member stores the plurality of articles to be transported in the respective storing chambers B1 of the UGV 1 on the basis of the storage position information. Incidentally, assumed is a case where it is difficult to store all of the plurality of articles to be transported in the storing chambers B1 of the UGV 1 by means of the above processing, but in this case, the articles difficult to be stored in the storing chambers B1 may be transported by another UGV 1.

(2-2. Processing Related to Article Movement Control and Temperature Control Executed by UGV 1)

Next, processing related to the article movement control and the temperature control executed by the control unit 17 of the UGV 1 will be described with reference to FIG. 11. FIG. 11 is a flowchart illustrating an example of the processing related to the article movement control and the temperature control executed by the control unit 17 of the UGV 1. Incidentally, the control unit 17 performs the travel control and the article transfer control separately from the processing illustrated in FIG. 11, but description of processing related to these control operations is omitted. Moreover, as a premise for the processing illustrated in FIG. 11, it is assumed that the article management information of the plurality of articles loaded as articles to be transported by the UGV 1 is stored in the storage unit 16, and the article management information is appropriately referred to by the control unit 17.

The processing illustrated in FIG. 11 is started when the UGV 1 starts transportation (that is, starts traveling) in accordance with the transportation destination information and the transportation schedule. At this time, the elapsed time period from the start of transportation is counted. When the processing illustrated in FIG. 11 is started, the control unit 17 determines whether or not the predetermined condition regarding the article stored in the storing chamber B1 is satisfied (step S21). Incidentally, in a case where the plurality of stages of storing chambers B1 are provided in the UGV 1, it is preferable to determine whether or not the predetermined condition regarding the article stored in the storing chamber B1 located at the lowermost stage among the plurality of storing chambers B1 is satisfied. Moreover, in a case where the plurality of stages and the plurality of columns of storing chambers B1 are provided in the UGV 1, it is preferable to sequentially determine whether or not the predetermined conditions regarding the articles stored in the respective storing chambers B1 located at the lowermost stage are satisfied.

Then, in a case where it is determined that the predetermined condition is satisfied (step S21: YES), the control unit 17 moves the article stored in the storing chamber B1 determined in step S21 to the storing chamber B2 (step S22). For example, in a case where the predetermined condition is the condition (i) and the condition (ii) described above, the control unit 17 determines whether or not the article stored in the storing chamber B1 requires the temperature management, and whether or not the article has not been received by the recipient at the transportation destination. Then, in a case where it is determined that the article stored in the storing chamber B1 requires the temperature management and where it is determined that the article has not been received by the recipient at the transportation destination, the article movement control unit 172 moves the article stored in the storing chamber B1 to the storing chamber B2, and the processing proceeds to step S23. Conversely, in a case where it is determined that the predetermined condition is not satisfied (step S21: NO), the processing proceeds to step S23.

Incidentally, although not illustrated, in a case where the storing chamber B1 exists at the upper stage of the storing chamber B1 which becomes empty as a result of movement to the storing chamber B2 in step S22, the article movement control unit 172 preferably determines whether or not the article is stored in the upper storing chamber B1. Then, in a case where it is determined that the article is stored in the upper storing chamber B1, the article movement control unit 172 moves the article stored in the upper storing chamber B1 to the storing chamber B1 located at the lower stage of the upper storing chamber B1. In a case where the storing chamber B1 exists further at the upper stage than the storing chamber B1 which becomes empty as a result of such movement, the article movement control unit 172 preferably determines whether or not the article is stored in the storing chamber B1 further at the upper stage. Then, in a case where it is determined that the article is stored in the storing chamber B1 further at the upper stage, the article movement control unit 172 preferably moves the article stored in the storing chamber B1 further at the upper stage to the storing chamber B1 located at the lower stage of the storing chamber B1 further at the upper stage.

In step S23, the control unit 17 acquires the cooling status of the storing chamber B2 from the storage unit 16. Subsequently, the control unit 17 determines whether or not the temperature control for the storing chamber B2 is started on the basis of the cooling status acquired in step S23 (step S24). In a case where it is determined that the temperature control for the storing chamber B2 is not started (step S24: NO), the processing proceeds to step S25. Conversely, in a case where it is determined that the temperature control for the storing chamber B2 is started (step S24: YES), the processing proceeds to step S29.

In step S25, the control unit 17 checks the start time of the temperature control and the elapsed time period from the start of transportation. Here, as described above, the start time of the temperature control is preferably calculated on the basis of the quality preservable time period of the article in the storing chamber B1 (for example, the storing chamber B1 located at the lowermost stage among the plurality of storing chambers B1) and the required cooling time period for the storing chamber B2. The required cooling time period for the storing chamber B2 is stored in the storage unit 16 in advance as setting information, for example. Incidentally, in a case where a plurality of columns of storing chambers B are provided in the UGV 1, the start time of the temperature control is preferably calculated on the basis of the quality preservable time period of the article in the storing chamber B1 and the required cooling time period for the storing chamber B2 for each column.

Subsequently, the control unit 17 determines whether or not the start time of the temperature control for the storing chamber B2 has come (that is, the elapsed time period from the start of transportation reaches or exceeds the start time of the temperature control) (step S26). Incidentally, in a case where a plurality of columns of storing chambers B are provided in the UGV 1, it is preferable to determine whether or not the start time of the temperature control for the storing chamber B2 has come for each column. In a case where it is determined that the start time of the temperature control has come (step S26: YES), the processing proceeds to step S27. Conversely, in a case where it is determined that the start time of the temperature control has not come (step S26: NO), the processing proceeds to step S31.

In step S27, the control unit 17 determines whether or not the refrigerated article or the frozen article is stored in the storing chamber B2 or the storing chamber B1 located in the upper stage (one stage upper) of the storing chamber B2. Incidentally, in a case where a plurality of columns of storing chambers B are provided in the UGV 1, it is preferable to determine whether or not the refrigerated article or the frozen article is stored in the storing chamber B2 or the storing chamber B1 for each column. In a case where it is determined that the refrigerated article or the frozen article is stored (step S27: YES), the control unit 17 starts the temperature control for the storing chamber B2 (step S28), and the processing proceeds to step S31. Incidentally, in a case where a plurality of columns of storing chambers B are provided in the UGV 1, it is preferable to start the temperature control for the storing chamber B2 in accordance with the determination result for each column. Conversely, in a case where it is determined that no refrigerated article or frozen article is stored (step S27: NO), the processing proceeds to step S31.

In step S29, it is determined whether or not the refrigerated article or the frozen article is stored in the storing chamber B2 or the storing chamber B1 located in the upper stage (one stage upper) of the storing chamber B2. Incidentally, in a case where a plurality of columns of storing chambers B are provided in the UGV 1, it is preferable to determine whether or not the refrigerated article or the frozen article is stored in the storing chamber B2 or the storing chamber B1 for each column. In a case where it is determined that the refrigerated article or the frozen article is stored (step S29: YES), the processing proceeds to step S31. Conversely, in a case where it is determined that no refrigerated article or frozen article is stored (step S29: NO), the control unit 17 stops the temperature control for the storing chamber B2 (step S30), and the processing proceeds to step S31. Incidentally, in a case where a plurality of columns of storing chambers B are provided in the UGV 1, it is preferable to stop the temperature control for the storing chamber B2 in accordance with the determination result for each column.

In step S31, the control unit 17 determines whether or not the last transportation destination has been reached (that is, the vehicle arrives at the last transportation destination and departs from the transportation destination). In a case where it is determined that the last transportation destination has not been reached (step S31: NO), the processing returns to step S21. Conversely, in a case where it is determined that the last transportation destination has been reached (step S31: YES), the processing ends.

Incidentally, the processing illustrated in FIG. 11 may be performed by the management server 2 using the article management database 221. In this case, in a case where it is determined in step S21 that the predetermined condition regarding the article stored in the storing chamber B1 is satisfied, the management server 2 transmits to the UGV 1 the control information for moving the article stored in the storing chamber B1 to the storing chamber B2 (step S22). Moreover, in a case where it is determined in step S27 that the refrigerated article or the frozen article is stored in the storing chamber B2 or the storing chamber B1 located at the upper stage of the storing chamber B2, the management server 2 transmits to the UGV 1 the control information for starting the temperature control for the storing chamber B2 (step S28). Moreover, in a case where it is determined in step S29 that no refrigerated article or frozen article is stored in the storing chamber B2 or the storing chamber B1 located at the upper stage of the storing chamber B2, the management server 2 transmits to the UGV 1 the control information for stopping the temperature control for the storing chamber B2 (step S30). Incidentally, in the processing illustrated in FIG. 11, the management server 2 manages the cooling status of the storing chamber B2.

As described above, according to the above embodiment, the UGV 1 is configured to move the article stored in the storing chamber B1 to the storing chamber B2 and perform the temperature control for the storing chamber B2 in a case where it is determined that the predetermined condition regarding the article stored in the storing chamber B1 among the plurality of storing chambers B is satisfied. Therefore, it is possible to improve the efficiency of energy consumption associated with the temperature control in the plurality of storing chambers B. Moreover, according to the above embodiment, the UGV 1 is configured to collect a plurality of articles (articles requiring the temperature management) that have not been received by the recipient at the transportation destination (that is, that are brought back) in the specific storing chamber B2 and perform the temperature control for the storing chamber B2. Therefore, it is possible to further improve the efficiency of energy consumption associated with the temperature control.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. Although the example in which the storing chamber B1 and the storing chamber B2 are provided in the vertical direction in the UGV 1 has been described in the above embodiment, the storing chamber B1 and the storing chamber B2 may be provided so as to be arranged side by side in the horizontal direction. In this case, the UGV 1 includes an article movement mechanism that horizontally moves an article from the storing chamber B1 to the storing chamber B2, and the article movement mechanism is driven in response to a control command output from the article movement control unit.

Moreover, in the above embodiment, the example in which the temperature control for cooling the inside of the storing chamber B2 is performed has been described. However, temperature control for warming (for example, setting the set temperature to about 15° C. to 20° C.) the inside of the storing chamber B2 may be performed. For example, in a case where a predetermined condition regarding an article to be transported is satisfied in a cold district where the temperature is below the freezing point, the article stored in the storing chamber B1 is moved to the storing chamber B2, whereby the article can be prevented from being cooled or frozen. Moreover, in the above embodiment, the UGV 1 capable of autonomously traveling on the ground in an unmanned manner has been described as an example of the transportation machine, but the present embodiment is also applicable to a transportation machine on which a person rides and operates. Moreover, the present embodiment is also applicable to a UAV (Unmanned Aerial Vehicle) such as a drone capable of autonomously flying in the air in an unmanned manner. Moreover, the present embodiment is also applicable to an aircraft on which a person boards and maneuvers.

REFERENCE SIGNS LIST

1 UGV
2 Management server
11 Drive unit
12 Positioning unit
13 Communication unit
14 Sensor unit
15 Operation/display unit
16 Storage unit
17 Control unit
21 Communication unit
22 Storage unit
23 Control unit
171 Travel control unit
172 Article movement control unit
173 Article transfer control unit
174 Temperature control unit
S Transportation System

What is claimed is:

1. A control device configured to control a transportation machine including a plurality of compartments each capable of storing an article, the control device comprising:
   at least one memory configured to store program code; and
   at least one processor configured to access the program code and operate as instructed by the program code, the program code including:
      determination code configured to cause the at least one processor to determine whether a predetermined condition regarding an article stored in a first compartment among the plurality of compartments is satisfied in accordance with temperature management information associated with the article, wherein the temperature management information specifies a predetermined time period for maintaining a quality of the article in the first compartment in which a temperature of the first compartment is not controlled,
      article movement control code configured to cause the at least one processor to move, based on determining the predetermined condition is satisfied, the article from the first compartment to a second compartment among the plurality of compartments, the second compartment having a temperature that is controllable; and
      temperature control code configured to cause the at least one processor to perform temperature control for the second compartment.

2. The control device according to claim 1, wherein the predetermined condition includes a condition that the article requires temperature management.

3. The control device according to claim 1, wherein the predetermined condition includes a condition that the article has not been received by a recipient.

4. The control device according to claim 1, wherein the predetermined condition includes a condition that an elapsed time period from start of transportation of the article exceeds a predetermined time period associated with the article.

5. The control device according to claim 1, wherein
the plurality of compartments include a plurality of first compartments, and
the article movement control code causes the at least one processor to move the article stored in each of the first compartments to the second compartment.

6. The control device according to claim 1, wherein the temperature control code causes the at least one processor to start the temperature control for the second compartment before the article moves from the first compartment to the second compartment after start of transportation of the article.

7. The control device according to claim 1, wherein the temperature control code causes the at least one processor to start the temperature control for the second compartment when start time of the temperature control comes after start of transportation of the article.

8. The control device according to claim 7, wherein the start time of the temperature control is determined on a basis of a time period during which temperature of the first compartment is kept in a temperature range in which quality of the article in the first compartment is preservable due to a temperature keeping effect of the first compartment.

9. The control device according to claim 1, wherein the temperature control code causes the at least one processor to stop the temperature control for the second compartment when the article is not present in either the first compartment or the second compartment by being received by a recipient after start of transportation of the article.

10. The control device according to claim 1, wherein the temperature control code causes the at least one processor to perform the temperature control for cooling an inside of the second compartment.

11. A transportation machine configured to include a plurality of compartments each capable of storing an article, the transportation machine comprising:
an actuator configured to move, in response to a control command output based on determining that a predetermined condition is satisfied, a door such that an article stored in a first compartment among the plurality of compartments moves to a second compartment among the plurality compartments,
wherein a temperature of the second compartment is controllable,
wherein a temperature of the first compartment is not controlled,
wherein whether the predetermined condition is satisfied is in accordance with temperature management information associated with the article, and
wherein the temperature management information specifies a predetermined time period for maintaining a quality of the article in the first compartment.

12. The transportation machine according to claim 11, further comprising an actuator configured to lock a door of the second compartment to make it impossible for a recipient at a transportation destination of the article to receive the article from the second compartment and unlock a door of the first compartment to make it possible for the recipient to receive the article from the first compartment.

13. The transportation machine according to claim 11, wherein
the compartments are provided in a plurality of stages in a vertical direction,
the actuator is configured to move the article stored in the first compartment located at an upper stage to the second compartment located at a lower stage by opening a bottom portion of the first compartment.

14. The transportation machine according to claim 13, wherein
the plurality of compartments include a plurality of first compartments provided in a plurality of stages in the vertical direction,
the actuator is configured to move the article stored in a first compartment of the plurality of first compartments located at an upper stage to a first compartment of the plurality of first compartments located at a lower stage by opening a bottom portion of the first compartment located at the upper stage.

15. A control method executed by a computer that controls a transportation machine including a plurality of compartments each capable of storing an article, the control method including:
determining whether a predetermined condition regarding an article stored in a first compartment among the plurality of compartments is satisfied in accordance with temperature management information associated with the article, wherein the temperature management information specifies a predetermined time period for maintaining a quality of the article in the first compartment in which a temperature of the first compartment is not controlled,
moving, based on determining the predetermined condition is satisfied, the article from the first compartment to a second compartment among the plurality of compartments, the second compartment having a temperature that is controllable; and
performing temperature control for the second compartment.

16. A transportation system comprising:
a transportation machine including a plurality of compartments each capable of storing an article;
an actuator configured to move, in response to a control command output based on determining that a predetermined condition is satisfied, a door such that an article stored in a first compartment among the plurality of compartments moves to a second compartment among the plurality of compartments; and
a temperature control unit configured to perform temperature control for the second compartment,
wherein a temperature of the first compartment is not controlled,
wherein whether the predetermined condition is satisfied is in accordance with temperature management information associated with the article, and
wherein the temperature management information specifies a predetermined time period for maintaining a quality of the article in the first compartment.

* * * * *

UNITED STATES PATENT AND TRADEMARK OFFICE
CERTIFICATE OF CORRECTION

| | | |
|---|---|---|
| PATENT NO. | : 12,372,290 B2 | Page 1 of 1 |
| APPLICATION NO. | : 17/679585 | |
| DATED | : July 29, 2025 | |
| INVENTOR(S) | : Toshiaki Tazume | |

It is certified that error appears in the above-identified patent and that said Letters Patent is hereby corrected as shown below:

On the Title Page

Column 1, please add item (30):
-- Foreign Application Priority Data
February 25, 2021 (JP) 2021-028466 --

Signed and Sealed this
Thirtieth Day of September, 2025

John A. Squires
*Director of the United States Patent and Trademark Office*